United States Patent
Yu et al.

(10) Patent No.: US 10,571,713 B2
(45) Date of Patent: Feb. 25, 2020

(54) CAMERA MODULE HAVING GUIDING PORTION BETWEEN FIXED PORTION AND MOVABLE PORTION

(71) Applicant: Samsung Electronics Co., Ltd., Gyeonggi-do (KR)

(72) Inventors: Young-Bok Yu, Gyeonggi-do (KR); Se-Won Kim, Gyeonggi-do (KR); Hyung-Jin Rho, Seoul (KR); Young-Kwon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 480 days.

(21) Appl. No.: 15/304,705

(22) PCT Filed: Aug. 1, 2014

(86) PCT No.: PCT/KR2014/007118
§ 371 (c)(1),
(2) Date: Oct. 17, 2016

(87) PCT Pub. No.: WO2016/013708
PCT Pub. Date: Jan. 28, 2016

(65) Prior Publication Data
US 2017/0052387 A1    Feb. 23, 2017

(30) Foreign Application Priority Data
Jul. 24, 2014  (KR) .................. 10-2014-0093909

(51) Int. Cl.
*G02B 7/04* (2006.01)
*G02B 27/64* (2006.01)
*G03B 5/06* (2006.01)
*H04N 5/225* (2006.01)
(Continued)

(52) U.S. Cl.
CPC ............. *G02B 27/646* (2013.01); *G02B 7/04* (2013.01); *G03B 5/00* (2013.01); *G03B 5/02* (2013.01);
(Continued)

(58) Field of Classification Search
CPC . G02B 7/023; G02B 7/04; G02B 7/09; G02B 7/10; G02B 7/102; G02B 23/16;
(Continued)

(56) References Cited

U.S. PATENT DOCUMENTS

| 6,064,827 A | 5/2000 | Toyoda |
| 2005/0169618 A1 | 8/2005 | Akada |

(Continued)

FOREIGN PATENT DOCUMENTS

| CN | 102017604 | 4/2011 |
| CN | 103869445 | 6/2014 |

(Continued)

OTHER PUBLICATIONS

Chinese Office Action dated Jun. 1, 2018 issued in counterpart application No. 201480079010.7, 11 pages.
(Continued)

*Primary Examiner* — Ryan S Dunning
(74) *Attorney, Agent, or Firm* — The Farrell Law Firm, P.C.

(57) ABSTRACT

A camera module according to various embodiments of the present invention comprises: a fixed part; a movable part for receiving a lens assembly, the movable part being coupled to the fixed part to be movable in a plane perpendicular to an optic axis of the lens assembly; and a guiding part for guiding the movement of the movable part, the guiding part being interposed between the fixed part and the movable part, wherein the guiding part can be formed in a C shape of which at least one side is opened. The camera module as above can be implemented variously according to the embodiments.

16 Claims, 9 Drawing Sheets

(51) Int. Cl.
*G03B 5/00* (2006.01)
*G03B 5/02* (2006.01)
*H04N 5/232* (2006.01)

(52) U.S. Cl.
CPC ......... *H04N 5/2254* (2013.01); *H04N 5/2257* (2013.01); *G03B 2205/0015* (2013.01); *G03B 2205/0053* (2013.01); *H04N 5/2253* (2013.01); *H04N 5/23287* (2013.01)

(58) Field of Classification Search
CPC ........ G02B 27/64; G02B 27/646; G03B 3/10; G03B 5/00; G03B 5/02; G03B 5/04; G03B 2205/0007; G03B 2205/0015; G03B 2205/0023; G03B 2205/0038; G03B 2205/0053; G03B 2205/0069; G03B 2205/0084; G03B 2205/2205; H04N 5/2253; H04N 5/2254; H04N 5/2257; H04N 5/23264; H04N 5/2328; H04N 5/23287
USPC ................ 348/208.99, 208.4, 208.7, 208.11; 359/554, 557, 819, 822, 823, 824; 396/52, 55
See application file for complete search history.

(56) References Cited

U.S. PATENT DOCUMENTS

| | | | |
|---|---|---|---|
| 2008/0085108 A1* | 4/2008 | Sekino | ..................... G03B 5/08 396/55 |
| 2009/0303595 A1 | 12/2009 | Lim et al. | |
| 2010/0309324 A1 | 12/2010 | Shirono | |
| 2011/0013283 A1* | 1/2011 | Sato | ..................... G02B 27/646 359/557 |
| 2012/0082442 A1 | 4/2012 | Kwon et al. | |
| 2012/0293671 A1 | 11/2012 | Chan et al. | |
| 2014/0009631 A1 | 1/2014 | Topliss | |
| 2014/0160311 A1 | 6/2014 | Hwang et al. | |
| 2014/0368937 A1* | 12/2014 | Seol | ......................... G03B 3/10 359/824 |

FOREIGN PATENT DOCUMENTS

| | | |
|---|---|---|
| JP | 2005250284 | 9/2005 |
| JP | 2013-160995 | 8/2013 |
| KR | 1020090127637 | 12/2009 |
| KR | 101085645 | 11/2011 |
| KR | 1020120097117 | 9/2012 |
| KR | 1020130044438 | 5/2013 |
| KR | 1020140144126 | 12/2014 |
| WO | WO 2009/069968 | 6/2009 |

OTHER PUBLICATIONS

European Search Report dated Feb. 13, 2018 issued in counterpart application No. 14897971.9-1208, 7 pages.
PCT/ISA/210 Search Report issued on PCT/KR2014/007118 (pp. 3).
PCT/ISA/237 Written Opinion issued on PCT/KR2014/007118 (pp. 4).

* cited by examiner

CAMERA MODULE HAVING GUIDING PORTION BETWEEN FIXED PORTION AND MOVABLE PORTION

PRIORITY

This application is a National Phase Entry of PCT International Application No. PCT/KR2014/007118, which was filed on Aug. 1, 2014, and claims priority to Korean Patent Application No. 10-2014-0093909, which was filed on Jul. 24, 2014the contents of each of which are incorporated herein by reference.

TECHNICAL FIELD

Various embodiments of the present disclosure relate to an optical device, for example, a camera module including a hand-shake corrector.

BACKGROUND ART

With the development of technologies for manufacturing digital cameras, electronic devices having small-size and light-weight camera modules mounted thereon, for example, mobile communication terminals have come into popular use and have taken over the compact digital camera market. As a camera module is mounted on a mobile communication terminal generally carried with a user at all times, the user may conveniently take the advantage of various functions such as video communication, augmented reality, etc., as well as capturing of still or moving images.

Mounting camera modules on electronic devices has become commonplace, and now efforts are being made to improve performance, e.g., display quality, of a camera module while miniaturizing the camera module. For example, an auto focusing function is one of techniques for improving the performance of the camera module. The auto focusing function enables a clear image to be obtained on an imaging surface of an image sensor by moving a lens positioned in front of the image sensor or the image sensor along an optical axis according to a distance to an object. The auto focusing function provided in a camera module of a high-price electronic device now becomes an essential function provided even in a camera module of a low-price popular electronic device.

A hand-shake correction technique is another example of the techniques for improving the performance of the camera module. The hand-shake correction technique compensates for a shake on an object due to human-caused vibration such as a hand-shake of a user. The hand-shake correction may include detecting vibration applied to an electronic device, such as a camera, etc., through multiple angular rate sensors mounted on the electronic device and moving a lens or an image sensor according to an angular rate and a direction of the detected vibration.

DETAILED DESCRIPTION OF THE INVENTION

Technical Problem

As a guide structure or a driving device has been mounted on a camera module to implement an auto focusing function, a hand-shake correction function, etc., the volume of the camera module has increased. On the other hand, a small size and a light weight are required to secure portability of an electronic device, necessitating reduction of a size and a weight of the camera module while improving the performance of the camera module.

Therefore, various embodiments of the present disclosure provide a camera module having a small size and a light weight while having an auto focusing function, a hand-shake correction function, and so forth.

Technical Solution

A camera module according to various embodiments of the present disclosure includes a fixed portion, a movable portion which receives a lens assembly, is coupled to the fixed portion, and moves on a plane perpendicular to an optical axis of the lens assembly, and a guiding portion interposed between the fixed portion and the movable portion to guide movement of the movable portion, in which the guiding portion has an alphabet 'C' shape, at least a side of which is open.

In an embodiment, the camera module may further include balls interposed between the fixed portion and the guiding portion, between the guiding portion and the movable portion, and between the fixed portion and the movable portion, respectively, and at least one of the balls is disposed to contact the fixed portion and the movable portion at the same time.

Effects of the Invention

In a camera module according to various embodiments of the present disclosure, hand-shake correction is enabled as a movable portion moves on a plane that is perpendicular to an optical axis, thereby improving performance, for example, the quality of a captured still or moving image. Moreover, a driving device (a magnet, a coil, etc.) for hand-shake correction is disposed on an edge of the camera module (e.g., an edge of a housing), and a side of a guiding portion is opened, thereby implementing a shape of the alphabet 'C' to reduce a horizontal or vertical width of the camera module and thus miniaturizing the camera module. Furthermore, by using a magnet or the like for hand-shake correction, a position of a lens assembly is maintained stably in an initial state (when power is not supplied), thereby improving reliability.

BEST MODE FOR CARRYING OUT THE INVENTION

Figure 1:
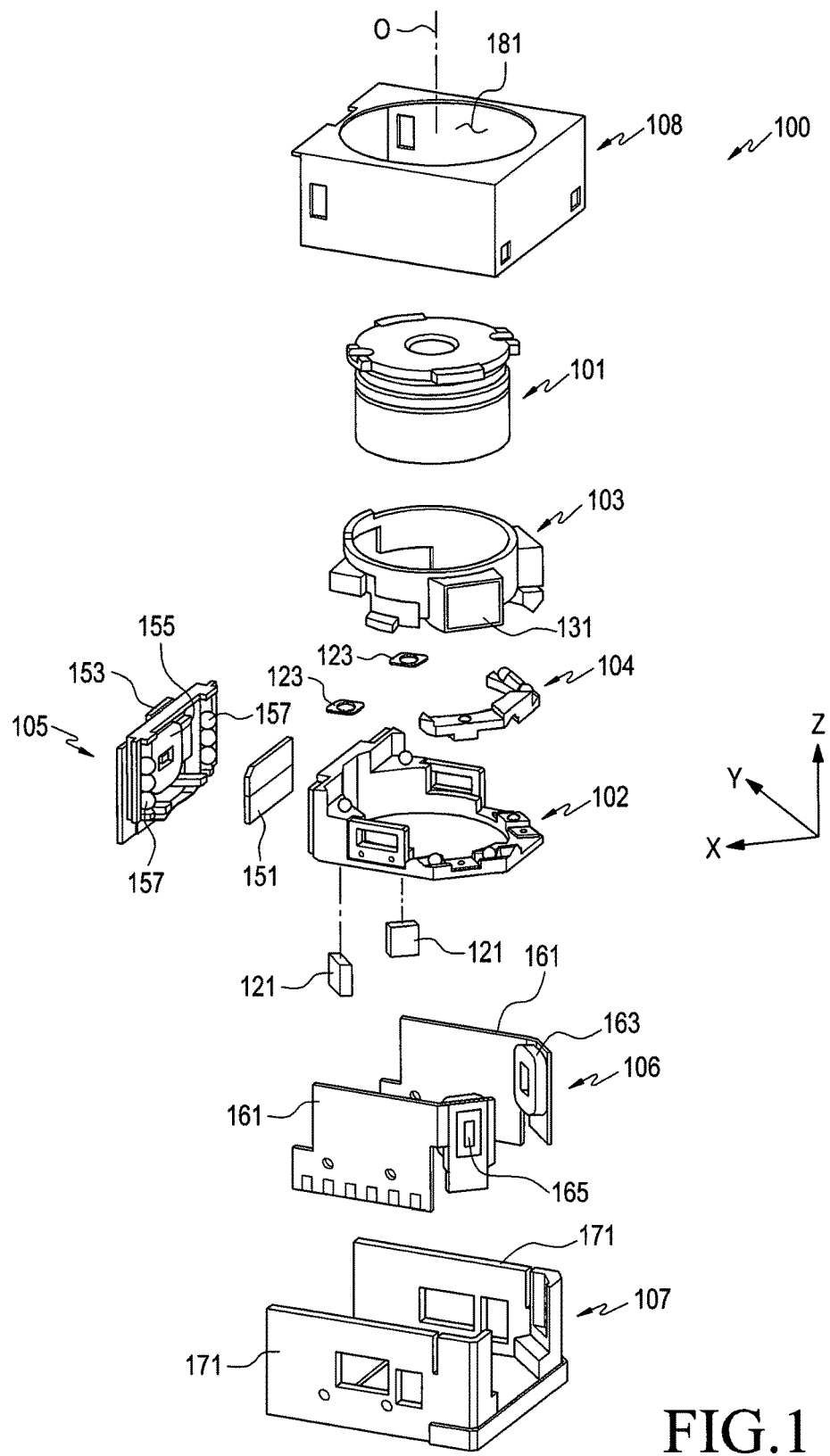
FIG. 1 is an exploded perspective view of a camera module according to one of various embodiments of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although ordinal numbers such as "first", "second", and so forth will be used to describe various components of the present disclosure, those components are not limited by the terms. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

Relative terms used based on illustration in the drawings, such as a "front side", a "rear side", a "top surface", a "bottom surface", and the like, may be replaced with ordinal numbers such as "first", "second", and the like. The order of the ordinal numbers such as "first", "second", and the like is a mentioned order or an arbitrarily set order, and may be changed as needed.

The terms used in the present disclosure are for the purpose of describing particular exemplary embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure.

A camera module according to various embodiments of the present disclosure includes a fixed portion, a movable portion for receiving a lens assembly, the movable portion being coupled to the fixed portion to be movable in a plane perpendicular to an optical axis of the lens assembly, and a guiding portion for guiding the movement of the movable portion, the guiding portion being interposed between the fixed portion and the movable portion, in which the guiding portion is formed in a C shape in which at least one side is opened.

In an embodiment, the camera module may include balls interposed between the fixed portion and the guiding portion, between the guiding portion and the movable portion, and between the fixed portion and the movable portion, respectively.

The camera module may further include at least one V grooves extending in any direction on at least a surface of the guiding portion and a ball pocket protruding from the at least a surface of the guiding portion to form a bearing groove on another surface, in which the V groove and the bearing groove receive one of the balls, respectively.

In an embodiment, a pair of the V grooves may be formed having the ball pocket therebetween, and the V grooves and the ball pocket may be arranged in a direction the V grooves extend.

In another embodiment, the V grooves may be formed on opposite surfaces of the guiding portion, respectively, the V groove formed on one of the opposite surfaces may extend in a first direction, and the V groove formed on the other surface may extend in a second direction perpendicular to the first direction.

In the camera module, the ball received in the V groove and the ball received in the bearing groove may overlap in at least parts thereof along the optical axis.

In the camera module, at least a part of the ball received in the V groove may protrude from a surface of the guiding portion and at least a part of the ball received in the bearing groove may protrude from the other surface of the guiding portion.

In another embodiment, the camera module may further include a second V groove formed in the fixed portion and the movable portion, in which at least a part of the ball received in the V groove is received in the second V groove.

In an embodiment, the camera module may further include at least one magnet mounted on one of the fixed portion and the movable portion and at least one yoke mounted on the other of the fixed portion and the movable portion to correspond to the magnet, in which the magnet and the yoke generate magnetic forces for urging the movable portion to closely contact the fixed portion along the optical axis.

Two pairs of the magnets may be disposed symmetric to the optical axis.

In another embodiment, at least one of the balls may contact the fixed portion and the movable portion at the same time.

In an embodiment, the guiding portion may move with respect to the fixed portion in a first direction on a plane perpendicular to the optical axis, and the movable portion may move with respect to the guiding portion in a second direction while moving together with the guiding portion in the first direction, and the second direction may be set perpendicular to the first direction.

The camera module may further include a housing which receives the fixed portion, the movable portion, and the guiding portion and comprises at least one side parallel to the optical axis, and the one side may be disposed inclined with respect to the first direction and the second direction.

The camera module may further include at least one magnet mounted on the movable portion to face any one of the first direction and the second direction and a coil mounted on the housing to face the magnet, in which the movable portion moves in a direction the magnet faces by an electromagnetic force generated by the magnet and the coil.

In another embodiment, wherein a pair of the magnets may be mounted to face the first direction and the second direction, respectively.

The camera module may further include a focusing driving unit provided on a side of the fixed portion to urge the fixed portion to move back and forth along the optical axis.

Figure 2:
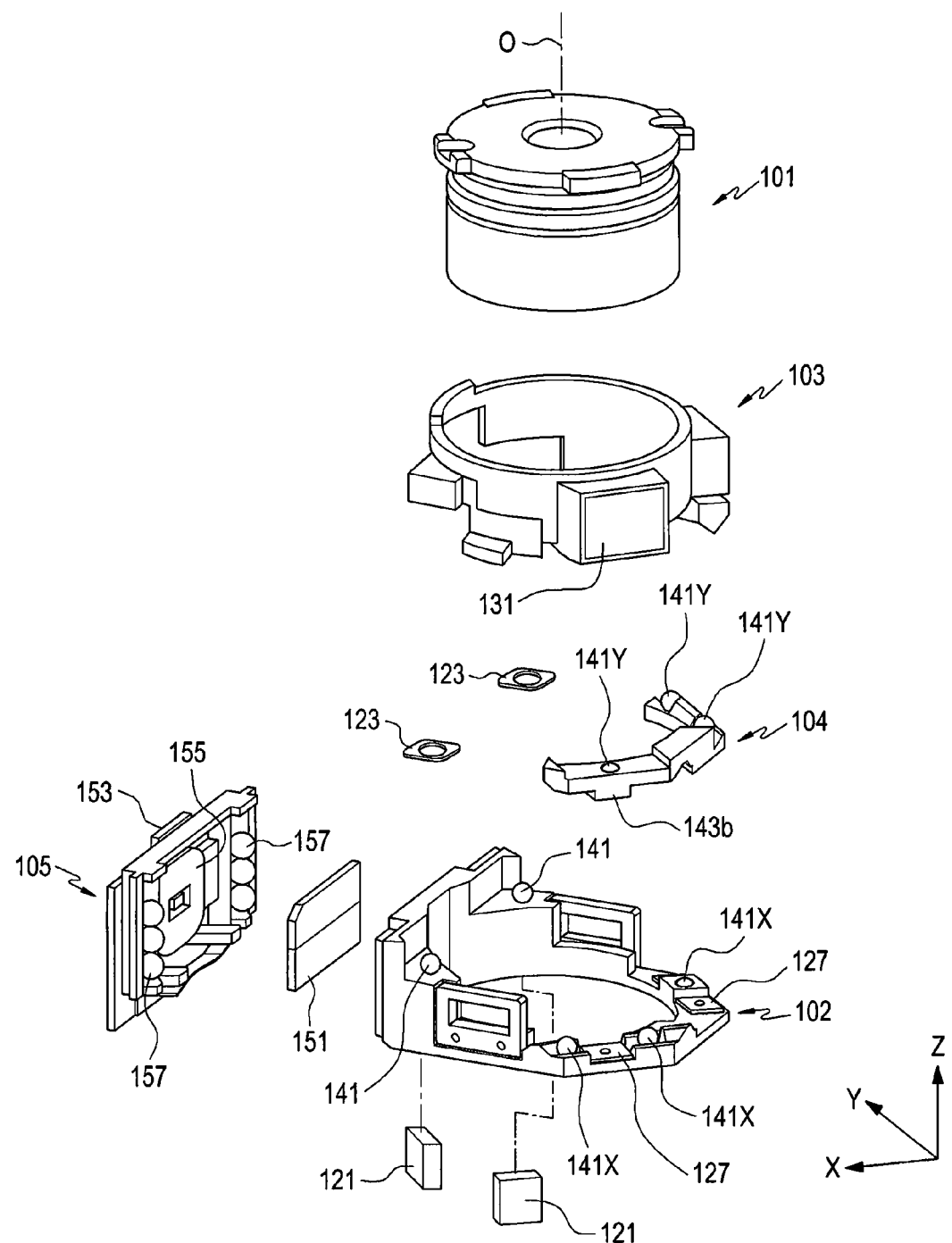
FIG. 2 is an exploded perspective view of main portions of a camera module according to one of various embodiments of the present disclosure.
Figure 3:
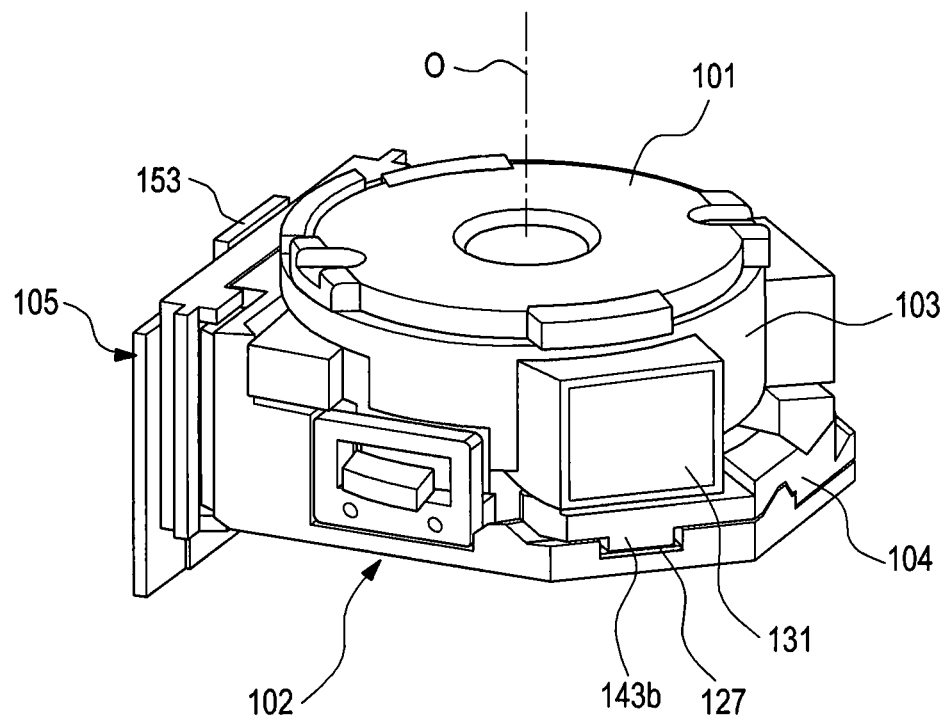
FIG. 3 is an assembled perspective view of main portions of a camera module according to one of various embodiments of the present disclosure.
Figure 4:
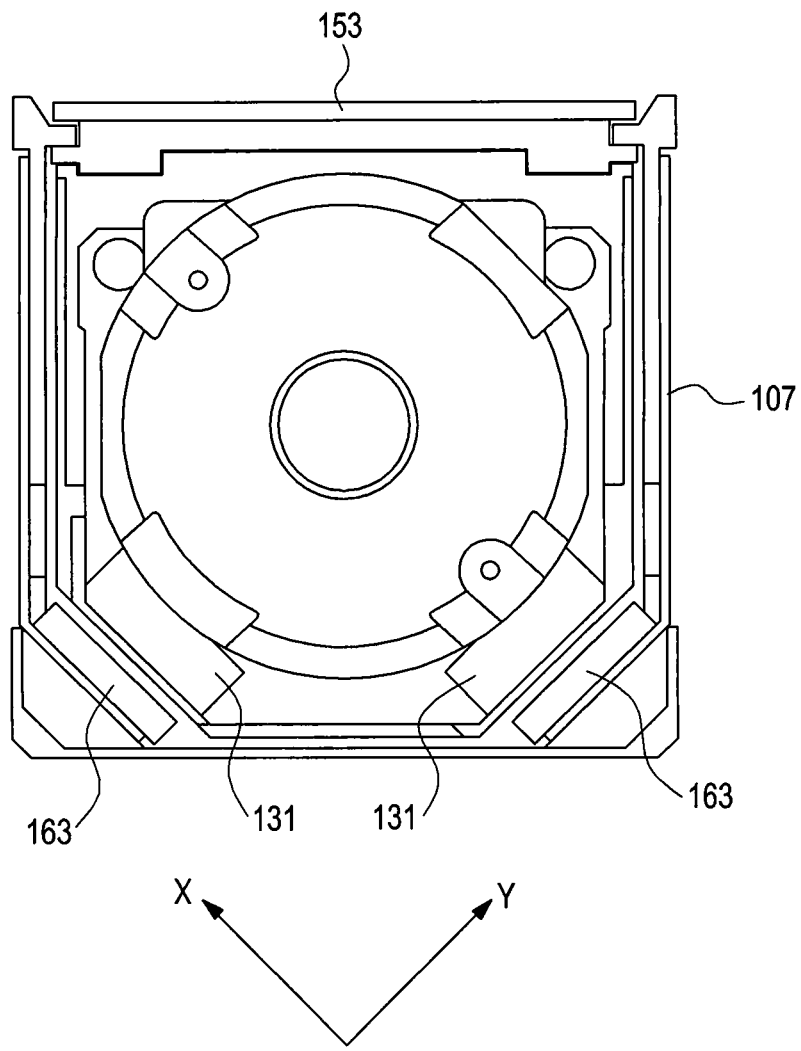
FIG. 4 is a plane view of a camera module according to one of various embodiments of the present disclosure.

FIG. 1 is an exploded perspective view of a camera module according to one of various embodiments of the present disclosure. FIG. 2 is an exploded perspective view of main portions of a camera module according to one of various embodiments of the present disclosure. FIG. 3 is an assembled perspective view of main portions of a camera module according to one of various embodiments of the present disclosure. FIG. 4 is a plane view of a camera module according to one of various embodiments of the present disclosure.

Referring to FIGS. 1 through 4, a camera module 100 according to one of various embodiments of the present disclosure may include a fixed portion 102, a movable portion 103, and a guiding portion 104, and as the movable portion 103 moves on a plane (e.g., an X-Y plane) that is perpendicular to an optical axis O of a lens assembly 101 due to a hand-shake of a user, the camera module 100 performs hand-shake correction. Moreover, the fixed portion 102 performs an auto focusing function while moving back and forth along the optical axis O. The camera module 100 may further include a driving device (e.g., a magnet and a coil) that moves the movable portion 102 on the plane that is perpendicular to the optical axis O and a driving device (e.g., another magnet and another coil) that moves the fixed portion 102 back and forth along the optical axis O. The camera module 100 may further include a housing 107 and a cover member 108 that receive the fixed portion 102, the movable portion 103, and the guiding portion 104.

The lens assembly 101 may include at least one lens and is received in the movable portion 103. As the fixed portion 102 moves back and forth along the optical axis O, the lens assembly 101 performs focusing while moving back and forth along the optical axis O. As the movable portion 103 moves on the plane perpendicular to the optical axis O, the lens assembly 101 performs hand-shake correction while moving on the plane perpendicular to the optical axis O.

The fixed portion 102 is received in the housing 107 in a way to move back and forth along the optical axis O and guides and supports movement of the movable portion 103. The fixed portion 102 may have a globally cylindrical shape having an open side. For example, the fixed portion 102 may include a partially cylindrical inner wall and a part of a lower end portion thereof may have a frame shape.

The movable portion 103 receives the lens assembly 101, and is coupled with the fixed portion 102 to face the fixed portion 102 along the optical axis O. The movable portion 103 may have a globally cylindrical shape having an open side. Substantially, the movable portion 103 is coupled to the fixed portion 102 to form a cylindrical shape. For example, a sidewall of the movable portion 103 may be positioned on an open side of the fixed portion 102, and a sidewall of the fixed portion 102 may be positioned on an open side of the movable portion 103. Thus, the lens assembly 101 is received in the movable portion 103, but a part of a circumferential surface of the lens assembly 101 may face an inner wall of the fixed portion 102.

The guiding portion 104 is interposed between the fixed portion 102 and the movable portion 103 along the optical axis O to guide and support movement of the movable portion 103. For example, the guiding portion 104 may move in a first direction X with respect to the fixed portion 102 and guide the movable portion 103 for movement of the movable portion 103 in a second direction Y. The movable portion 103 may move together with the guiding portion 104 in the first direction X with respect to the fixed portion 102 and move in the second direction Y with respect to the guiding portion 104. Herein, the second direction Y may be set perpendicular to the first direction X, and the first direction X and the second direction Y may be perpendicular to the optical axis O. As the guiding portion 104 is interposed between the fixed portion 102 and the movable portion 103, the movable portion 103 may move together with the guiding portion 104 in the first direction X with respect to the fixed portion 102 when the guiding portion 104 moves in the first direction X. The guiding portion 104 has a globally flat-plate frame shape having an open side, thus forming the alphabet 'C' shape.

The camera module 100 may include a first magnet 151 and a first coil 155 as a focusing driving unit (hereinafter, referred to as a 'first driving device 105') for urging the fixed portion 102 to move back and forth along the optical axis O.

In the housing 107 is mounted a guide member 153 that forms a side of the housing 107. The guide member 153 has a flat-plate shape disposed in parallel to the optical axis O, and guides and supports back and forth movement of the fixed portion 102. A plurality of balls 157 are disposed between the fixed portion 102 and the guide member 153 to facilitate back and forth movement of the fixed portion 102. The first magnet 151 is mounted on an outer side of the fixed portion 102 to form a magnetic field, and the first coil 155 is mounted on the guide member 153 to face the first magnet 151. The fixed portion 102 moves back and forth with an electromagnetic force, which is generated by the first coil 155 and the first magnet 151 according to a signal applied to the first coil 155. A yoke (not shown) may be mounted in the guide member 153. A magnetic force generated between the yoke mounted in the guide member 153 and the first magnet 151 may work in a direction to urge the fixed portion 102 to closely contact the guide member 153.

The camera module 100 may include a second magnet 131 and a second coil 163 as a driving unit (hereinafter, referred to as a 'second driving device 106') for urging the movable portion 103 to move, for example, in the first direction X and the second direction Y, on the plane that is perpendicular to the optical axis O. A pair of second magnets 131 and a pair of second coils 163 may be disposed to face the first direction X and the second direction Y. The second magnets 131 are attached to an outer surface of the movable portion 103. For example, one of the second magnets 131 may be attached to face the first direction X and the other may be attached to face the second direction Y.

Meanwhile, the housing 107 may include at least one side 171 that is parallel to the optical axis O, and the first direction X and the second direction Y may be disposed inclined with respect to the side 171. For example, the housing 107 may include a pair of sides that are parallel to the optical axis O and to each other, and the second magnets 131 may be mounted to be adjacent to one of the sides 171 and to be inclined with respect to the sides 171. The second coils 163 may be mounted in an inner side of the housing 107 to face the second magnets 131, respectively.

To apply an electric signal to the second coils 163, the second driving device 106 may include a flexible printed circuit board 161, and each of the second coils 163 may be mounted on the flexible printed circuit board 161. On the flexible printed circuit board 161, a position detecting sensor 165 (e.g., a hall sensor) is mounted to detect a position of the movable portion 103 (or the lens assembly 101 received in the movable portion 103). Once an electric signal is applied to the second coil 163 disposed to face the first direction X, the movable portion 103 and the lens assembly 101 move in the first direction X on the plane that is perpendicular to the optical axis O, and once an electric signal is applied to the second coil 163 disposed to face the second direction Y, the movable portion 103 and the lens assembly 101 move in the second direction Y on the plane that is perpendicular to the optical axis O. In this way, the movable portion 103 and the lens assembly 101 move by an electrical signal applied to at least one of the second coils 163 due to vibration caused by an external force such as user's hand-shake, thereby suppressing or alleviating shake of a captured image, caused by vibration.

When an electric signal is not applied to the second coils 163, the movable portion 103 is positioned inclined to a side in the housing 107 due to a magnetic force of the second magnets 131. To suppress inclination and dispose the movable portion 103 to the center of the housing 107, the camera module 100 may further include an auxiliary magnet 121 and an auxiliary yoke 123. A pair of auxiliary magnets 121 and a pair of auxiliary yokes 123 may be disposed symmetrically to the second magnets 131, respectively. The auxiliary magnets 121 may be disposed in one of the fixed portion 102 and the movable portion 103, and the auxiliary yokes 123 may be disposed in the other of the fixed portion 102 and the movable portion 103. In the current embodiment, as an example, the pair of auxiliary magnets 121 are pressively inserted into the fixed portion 102, and the pair of auxiliary yokes 123 are mounted in the movable portion 103 to correspond to the auxiliary magnets 121. A magnetic force generated between the auxiliary magnets 121 and the auxiliary yokes 123 may balance with the magnetic force generated by the second magnets 131, such that when the electric signal is not applied, the movable portion 103 may be positioned in the center on the housing 107, e.g., the fixed portion 102.

The lens assembly 101 or the movable portion 103 has a globally cylindrical shape and the housing 107 has a square pillar shape, such that the largest interval may be formed in an edge portion (an edge formed by two adjacent sides meeting each other) of the housing 107 between an outer side of the movable portion 103 and an inner side of the housing 107. The second driving device 106, e.g., the second magnets 131 and the second coils 163 are disposed in the edge portion of the housing 107, thereby reducing the size of the camera module 100. On the other hand, when the second magnets 131 and the second coils 163 are disposed in parallel to a side of the housing 107, the size of the camera module 100 may be increased by thicknesses and intervals of the second magnets 131 and the second coils 163. As such, the camera module according to various embodiments of the present disclosure may include the second driving device 106 disposed in the edge portion of the housing 107, thereby having a reduced size.

The guiding portion 104 has an open 'C' shape side, and may globally have a shape corresponding to a section where the second magnets 131 are disposed. For example, in adjacent to the edge portion of the housing 107 may be disposed structures in which the guiding portion 104 guides and supports the movable portion 103 to allow the movable portion 103 to move in the first direction X and the second direction Y that are inclined with respect to sides of the housing 107. Thus, it is possible to suppress an influence of the structures for guiding and supporting the movable portion in the first direction X and the second direction Y upon a size of the camera module 100. That is, the guiding portion 104 and the structure for guiding and supporting the movable portion 103 by using the guiding portion 104 may be implemented substantially in an area where the second magnets 131 are installed, contributing to miniaturization of the camera module 100.

Hereinafter, referring to FIGS. 5 through 12, a more detailed description will be made of a structure for guiding and supporting the movable portion 103 to allow the movable portion 103 to move on a plane perpendicular to the optical axis O.

First, referring to FIG. 2, a plurality of balls 141, 141X, and 141Y may be interposed between the fixed portion 102 and the guiding portion 104, between the guiding portion 104 and the movable portion 103, and between the fixed portion 102 and the movable portion 103, respectively. Hereinbelow, the plurality of balls 141, 141X, and 141Y interposed between the fixed portion 102 and the guiding portion 104, between the guiding portion 104 and the movable portion 103, and between the fixed portion 102 and the movable portion 103, respectively, may be described by being indicated by different reference numerals. For example, reference numeral '141X' may indicate balls guiding and supporting the guiding portion 104 when the guiding portion 104 moves in the first direction X, and reference numeral '141Y' may indicate balls guiding and supporting the movable portion 103 when the movable portion 103 moves in the second direction Y. Moreover, reference numeral '141' may indicate balls guiding and supporting the movable portion 103 when the movable portion 103 moves in the first direction X or the second direction Y.

Figure 5:
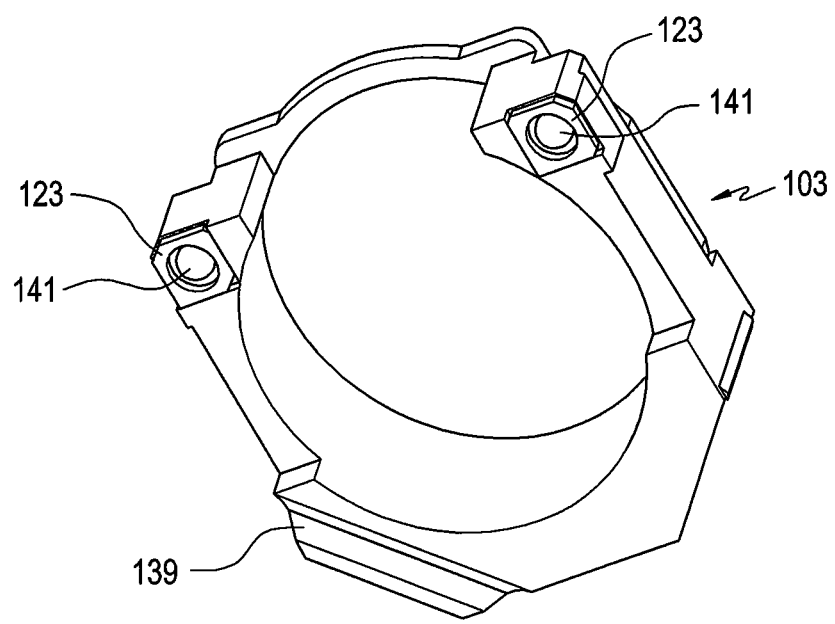
FIG. 5 is a perspective view of a movable portion of a camera module according to one of various embodiments of the present disclosure.

FIG. 5 is a perspective view of a movable portion of a camera module according to one of various embodiments of the present disclosure.

Further referring to FIG. 5, the balls 141 interposed between the fixed portion 102 and the movable portion 103 may roll in direct contact with the fixed portion 102 and the movable portion 103 at the same time. For example, when the movable portion 103 moves in the first direction X and the second direction Y, movement of the movable portion 103 may be facilitated, as the balls 141 roll. That is, the balls 141 contacting both the fixed portion 102 and the movable portion 103 at the same time may guide and support movement of the movable portion 103 even if the movable portion 103 moves in any direction on a plane that is perpendicular to the optical axis O.

The balls 141 are received in the movable portion 103 and at least a part thereof protrude from the bottom of the movable portion 103. The part of the ball 141 protruding from the bottom of the movable portion 103 contacts the fixed portion 102 to separate the movable portion 103 and the fixed portion 102. When the ball 141 is received in the movable portion 103, the auxiliary yoke 123 may be disposed to surround at least a part of the ball 141. For example, a hole may be formed in the auxiliary yoke 123, and a part of the ball 141 received in the movable portion 103 may be exposed through the hole of the auxiliary yoke 123.

Figure 6:
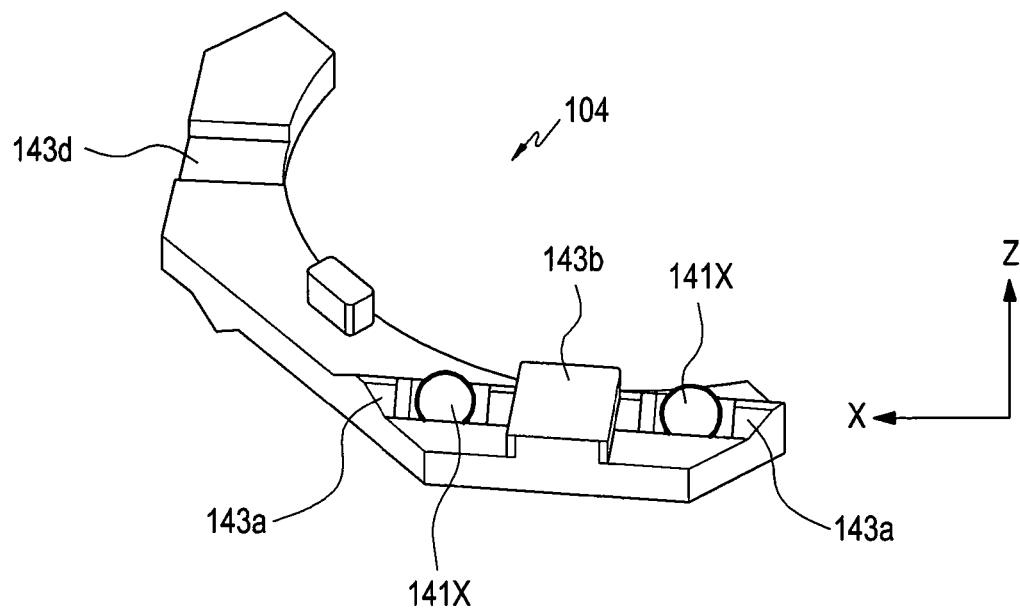
FIG. 6 is a perspective view of a guiding portion of a camera module according to one of various embodiments of the present disclosure.
Figure 7:
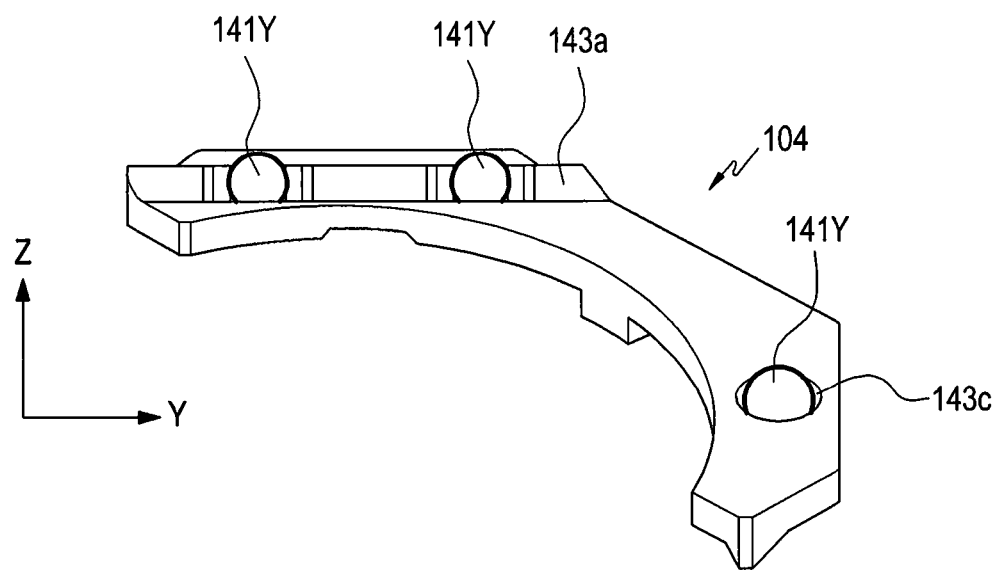
FIG. 7 is a perspective view of a guiding portion of a camera module according to one of various embodiments of the present disclosure, which is viewed from another direction.

FIG. 6 is a perspective view of a guiding portion of a camera module according to one of various embodiments of the present disclosure. FIG. 7 is a perspective view of a guiding portion of a camera module according to one of various embodiments of the present disclosure, which is viewed from another direction;

Referring to FIGS. 2, 6, and 7, at least one balls 141X and 141Y are disposed between the fixed portion 102 and the guiding portion 104 (a lower side of the guiding portion 104) and between the guiding portion 104 and the movable portion 103 (an upper side of the guiding portion 104), respectively. The balls 141X disposed on the lower side of the guiding portion 104 guide movement of the movable portion 103 along the first direction X, and the balls 141Y disposed on the upper side guide movement of the movable portion 103 along the second direction Y.

To receive at least some of the balls 141X and 141Y, at least one V groove 143a is formed on at least a surface of the guiding portion 104. In the current embodiment, the guiding portion 104 includes a pair of V grooves 143a formed in opposite surfaces thereof. The balls 141X and 141Y are received in the V grooves 143a, respectively, to guide and support movement of the guiding portion 104 with respect to the fixed portion 102 and movement of the movable portion 103 with respect to the guiding portion 104, respectively. The guiding portion 104 further includes a ball pocket 143b that protrudes from at least one surface to form a bearing groove 143c on another surface, and one of the balls 141X is received in the ball pocket 143b. The V groove 143a or the ball pocket 143b may be formed in the fixed portion 102 and the movable portion 103, respectively. This will be described in more detail with reference to FIG. 8.

The ball pocket 143b is formed between the V grooves 143a on a surface of the guiding portion 104. Thus, the bearing groove 143b is formed on another surface of the guiding portion 104. The V grooves 143 extend in a direction, respectively. For example, the V grooves 143a extend in the first direction X on a surface (e.g., a bottom surface) of the guiding portion 104 and extend in the second direction Y on another surface (e.g., a top surface) of the guiding portion 104. The V grooves 143a and the ball pocket 143b may be arranged in the first direction X on a surface of the guiding portion 104. Relative positions of the V grooves 143a and the ball pocket 143b are not limited to the disclosed embodiment. At least one of the balls 143X positioned on the lower side of the guiding portion 104 is received in the fixed portion 102 and at least partially protrudes toward the guiding portion 104. On a surface of the guiding portion 104 is provided a contact surface 143d which contacts the ball 141X received in the fixed portion 102 and is recessed to a predetermined depth from the surface of the guiding portion 104.

Referring to FIG. 7, on another surface (e.g., the top surface) of the guiding portion 104, the pair of V grooves 143a extending in the second direction Y are arranged in the second direction Y. The balls 141Y are received in the bearing groove 143c formed by the ball pocket 143b and the V grooves 143a, respectively, and the balls 141Y disposed on the top surface of the guiding portion 104 guide and support movement of the movable portion 103 along the second direction Y.

Referring back to FIGS. 5 and 7, a second V groove 139 corresponding to the V grooves 143a formed on the top surface of the guiding portion 104 is formed on a bottom surface of the movable portion 103. The second V groove 139 extends in the second direction Y to at least partially receive the balls 141Y disposed in the V grooves 143a on the top surface of the guiding portion 104. For example, at least some of the balls 141Y interposed between the movable portion 103 and the guiding portion 104 may be partially received in the V groove 143a and the second groove 139, respectively. The balls 141Y interposed between the movable portion 103 and the guiding portion 104 and received in the bearing groove 143c point-contact the movable portion 103 while rolling in the bearing groove 143c. The balls 141Y interposed between the guiding portion 104 and the movable portion 103 roll while separating the guiding portion 104 from the movable portion 103, thereby facilitating movement of the movable portion 103 (movement along the second direction Y) with respect to the guiding portion 104.

Figure 8:
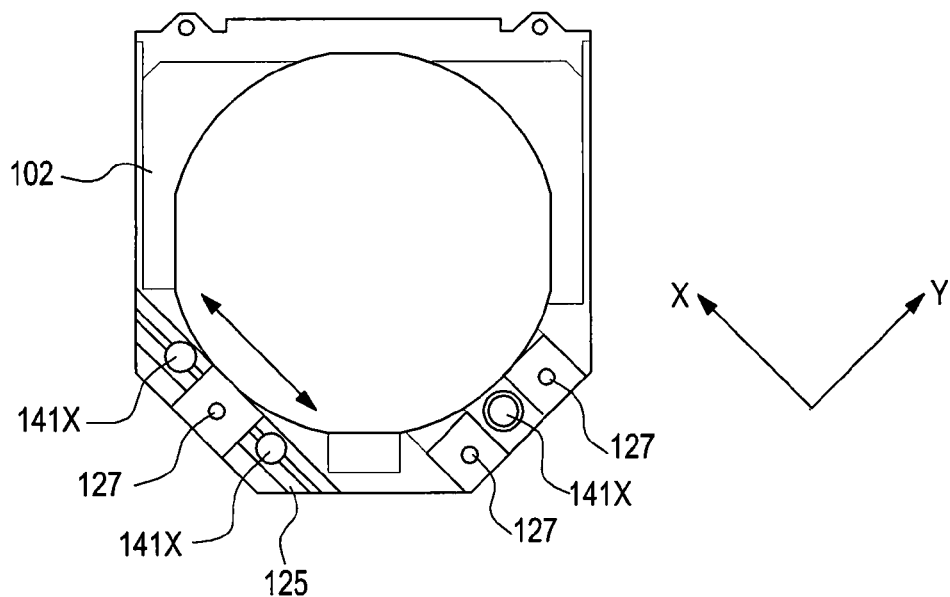
FIG. 8 is a plane view of a state in which balls are disposed in a fixed portion of a camera module according to one of various embodiments of the present disclosure.

FIG. 8 is a plane view of a state in which balls are disposed in a fixed portion of a camera module according to one of various embodiments of the present disclosure.

Further referring to FIG. 8, another second V grooves 125 are formed in the fixed portion 102 to extend in the first direction X. A pair of balls among the balls 141X interposed between the fixed portion 102 and the guiding portion 104 are partially received in the V groove 143a and the second V groove 125, respectively, and the ball 141X received in a bearing groove of the fixed portion 102 partially protrudes to point-contact the guiding portion 104. The V grooves 143a formed on a surface of the guiding portion 104 facing the fixed portion 102 also extend in the first direction X, such that the guiding portion 104 moves along the first direction X with respect to the fixed portion 102 while being guided and supported by the balls 141X.

Figure 9:
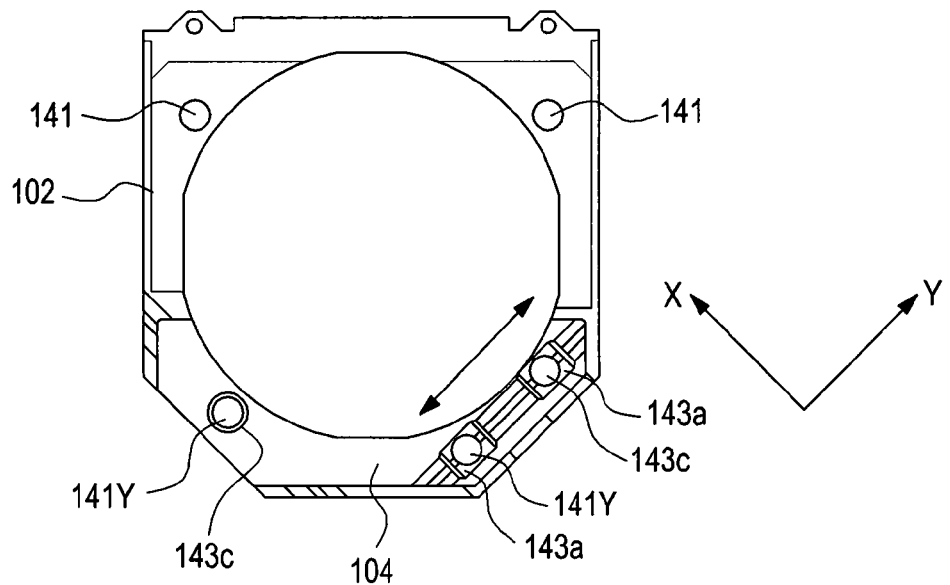
FIG. 9 is a plane view of a state in which a guiding portion is disposed in a fixed portion of a camera module according to one of various embodiments of the present disclosure.

FIG. 9 is a plane view of a state in which a guiding portion is disposed in a fixed portion of a camera module according to one of various embodiments of the present disclosure.

As mentioned above, on the bottom surface of the guiding portion 104 are formed the V grooves 143a extending in the first direction X to correspond to the second V grooves 125 and a contact surface 143d corresponding to the ball 141X received in the fixed portion 102. As shown in FIG. 9, once the guiding portion 104 is disposed in the fixed portion 102, a ball received in the fixed portion 102 among the balls 141X interposed between the fixed portion 102 and the guiding portion 104 point-contacts the contact surface 143d, some of the other balls are received in the V groove 143a, and some others are received in the second V groove 125. The fixed portion 102 and the guiding portion 104 are spaced apart from each other with a specific interval by the balls 141X, and the guiding portion 104 smoothly moves in the first direction X by being guided by the balls 141X.

Figure 10:
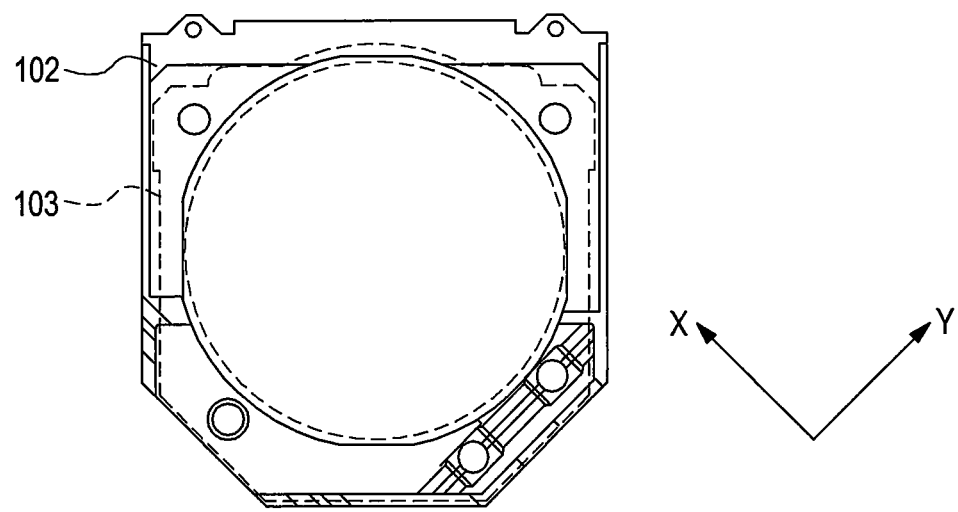
FIG. 10 is a plane view of a state in which a movable portion is disposed in a fixed portion of a camera module according to one of various embodiments of the present disclosure.

FIG. 10 is a plane view of a state in which a movable portion is disposed in a fixed portion of a camera module according to one of various embodiments of the present disclosure.

As stated above, on the bottom surface of the movable portion 103 is formed the another second V groove 139 extending in the second direction Y. As shown in FIG. 10, once the movable portion 103 is disposed in the fixed portion 102, a ball received in the bearing hole 143c among the balls 141Y interposed between the guiding portion 104 and the movable portion 103 point-contacts the bottom surface of the movable portion 103, some of the other balls are received in the V groove 143a, and some others are received in the another second V groove 139. The guiding portion 104 and the movable portion 103 are spaced apart from each other to some extent by the balls 141Y, and the movable portion 103 smoothly moves in the second direction Y by being guided by the balls 141Y. A structure has been mentioned above in which when the guiding portion 104 moves in the first direction X, the movable portion 103 moves together with the guiding portion 104 in the first direction X.

Meanwhile, the balls 141 interposed between the fixed portion 102 and the movable portion 103, e.g., the balls 141 that point-contact the fixed portion 102 while being received in the movable portion 103 facilitate movement of the movable portion 103 while rolling when the movable portion 103 moves in the first direction X or the second direction Y. That is, the balls 141 contacting both the fixed portion 102 and the movable portion 103 at the same time may guide and support movement of the movable portion 103 even if the movable portion 103 moves in any direction on the plane that is perpendicular to the optical axis O. The balls 141 contacting both the fixed portion 102 and the movable portion 103 at the same time may prevent the fixed portion 102 and the movable portion 103 from directly contacting each other by securing a specific interval between the fixed portion 102 and the movable portion 103.

Figure 11:
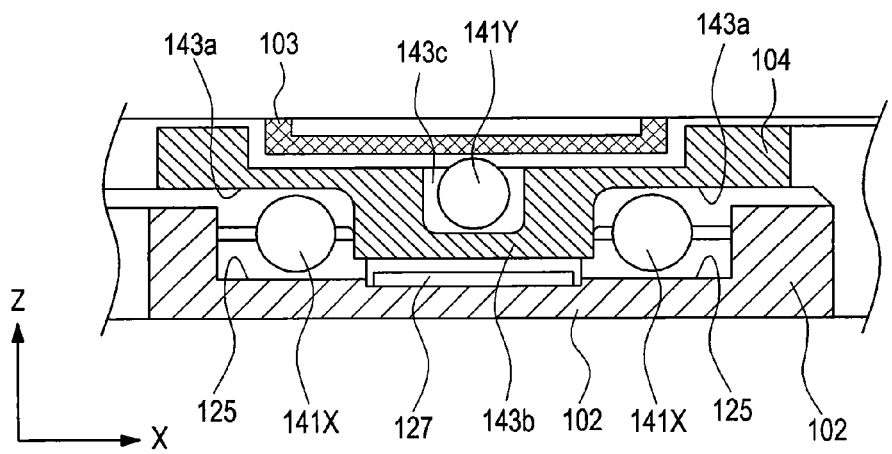
FIG. 11 is a cross-sectional view illustrating a movable guiding structure of a camera module according to one of various embodiments of the present disclosure.

FIG. 11 is a cross-sectional view illustrating a movable guiding structure of a camera module according to one of various embodiments of the present disclosure.

Referring to FIG. 11, at least some of the balls 141X interposed between the fixed portion 102 and the guiding portion 104 may be partially received in the V groove 143a and the second groove 125, respectively. It should be noted that in FIG. 11, for brevity, the V grooves 143a and the second V grooves 125 are illustrated slightly different from an actual 'V' shape. The balls 141X separate the guiding portion 104 and the fixed portion 102 by a specific interval while being partially received in the V groove 143a and the second V groove 125, respectively. At least one of the balls 141Y positioned between the guiding portion 104 and the movable portion 103 partially protrude from the top surface of the guiding portion 104 while being received in the bearing groove 143c. A part of the ball 141Y partially protruding from the top surface of the guiding portion 104 point-contacts the movable portion 103 to guide and support movement of the movable portion 103 in the second direction Y.

Meanwhile, the balls 141X and 141Y disposed on the top surface and the bottom surface of the guiding portion 104 may at least partially overlap. Herein, 'overlap' means that a part of the ball 141Y disposed on the top surface of the guiding portion 104 and the ball 141X disposed on the bottom surface of the guiding portion 104 are positioned in at least a part thereof in the same height along the optical axis O. This structure is possible when the V groove 143a and the bearing hole 143c are formed recessed on the opposite surfaces of the guiding portion 104, respectively. In this way, the thickness (a length along the optical axis O) of the camera module 100 may be reduced. For example, a diameter of the ball 141X disposed on the bottom surface of the guiding portion 104, a thickness of the guiding portion 104, and a diameter of the ball Y disposed on the top surface of the guiding portion 104 may be a part of the thickness of the camera module 100, and the balls 141X and 141Y at least partially overlap by using the V groove 143a and the bearing groove 143c, thereby reducing the thickness of the camera module 100.

Figure 12:
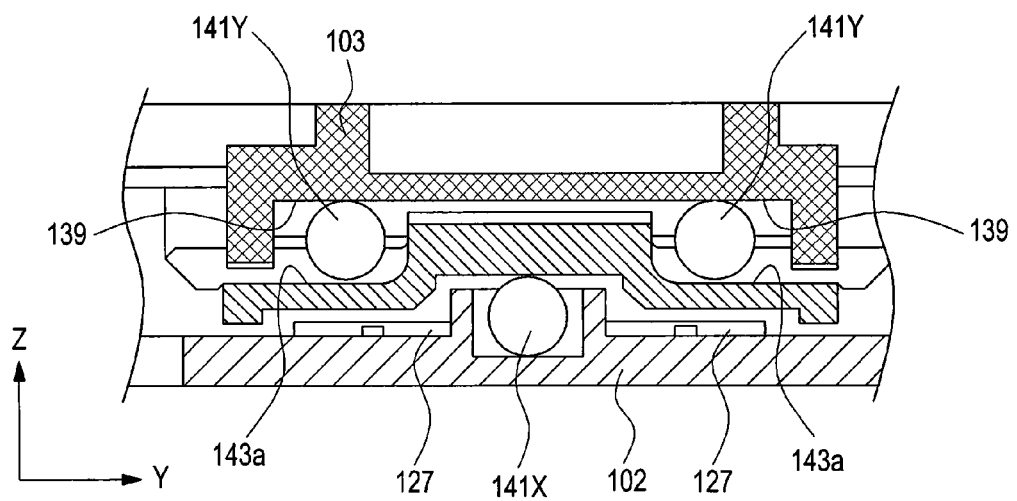
FIG. 12 is a cross-sectional view illustrating another movable guiding structure of a camera module according to one of various embodiments of the present disclosure.

FIG. 12 is a cross-sectional view illustrating another movable guiding structure of a camera module according to one of various embodiments of the present disclosure.

Referring to FIG. 12, at least some of the balls 141Y interposed between the guiding portion 104 and the fixed portion 103 may be partially received in the V groove 143a and the second groove 139, respectively. It should be noted that in FIG. 12, for brevity, the V grooves 143a and the second V grooves 139 are illustrated slightly different from an actual 'V' shape. The balls 141Y separate the guiding portion 104 and the fixed portion 103 by a specific interval while being partially received in the V groove 143a and the second V groove 139, respectively. At least one of the balls 141X positioned between the fixed portion 102 and the guiding portion 104 partially protrude from the top surface of the fixed portion 102 while being received in the fixed portion 102. A part of the ball 141X partially protruding from the top surface of the fixed portion 102 point-contacts the contact surface 143d of the guiding portion 104 to guide and support movement of the movable portion 104 in the first direction X.

The balls 141X and 141Y disposed on the top surface and the bottom surface of the guiding portion 104 may at least partially overlap, thereby contributing to reduction of the thickness of the camera module 100. The structure has already been described with reference to FIG. 11, and thus will not be described in detail.

Referring to FIGS. 8, 11, and 12, to guarantee stable movement of the movable portion 103 on the plane being perpendicular to the optical axis O, the camera module 100 may further include a plurality of yokes 127. For example, the auxiliary yokes 123 may stabilize movement of the movable portion 103 together with the auxiliary magnet 121. A plurality of other yokes 127 are disposed in the fixed portion 102 to face a side (e.g., a bottom surface) of the second magnet 131. Herein, the yokes 127 do not need to be disposed to directly face a side of the second magnet 131. For example, the guiding portion 104, a structure for fixing the second magnet 131, etc., may be interposed between the yokes 127 and the second magnet 131. The yokes 127 are disposed in adjacent to the balls 141X and 141Y or between the balls 141, 141X, and 141Y.

The yokes 127 and the second magnets 131 corresponding thereto are disposed to face each other in the optical axis O, such that magnetic forces generated by the yokes 127 and the second magnets 131 urge the movable portion 103 to closely contact the fixed portion 102. The auxiliary yokes 123 are disposed to face the auxiliary magnets 121 in the optical axis O and thus to generate a magnetic force for urging the movable portion 103 to closely contact the fixed portion 102. In this way, the guiding portion 104 may stably move on the plane perpendicular to the optical axis O with respect to the fixed portion 102 while being supported by some of the balls (e.g., the balls indicated by '141X'), and the movable portion 103 may stably move on the plane perpendicular to the optical axis O with respect to the fixed portion 102 and the guiding portion 104 while being supported by the balls 141, 141X, and 141Y.

The auxiliary magnets 121 and the auxiliary yokes 123 are disposed symmetric to the second magnets 131 and the yokes 127 along the optical axis O, thereby maintaining the movable portion 103 in the center of the housing 107 when an electric signal is not applied to the second coil 163. The auxiliary magnets 121 and the auxiliary yokes 123 do not need to be disposed symmetric to the second magnets 131 and the yokes 127 along the optical axis O. For example, if the magnetic forces generated by the auxiliary magnets 121 and the auxiliary yokes 123 balance with the magnetic forces generated by the second magnets 131 and the yokes 127 and thus the movable portion 103 is positioned in the center of the housing 107, installation positions of the auxiliary magnets 121 and the auxiliary yokes 123 may change variously.

When the lens assembly 101, the fixed portion 102, the guiding portion 104, the movable portion 103, the first driving device 105, and the second driving device 106 all are received in the housing 101, the cover member 108 is coupled to the housing 107, thus completing the camera module 100. By closing all the opened portions of the housing 107 except for a photographing aperture 181 for the lens assembly 101, the cover member 108 may protect components received in the housing 101.

While embodiments of the present disclosure have been described, various changes may be made without departing the scope of the present disclosure.

The invention claimed is:

1. A camera module comprising:
   a fixed portion;
   a movable portion which receives a lens assembly, is coupled to the fixed portion, and moves on a plane perpendicular to an optical axis of the lens assembly;
   a guiding portion interposed between the fixed portion and the movable portion to guide movement of the movable portion;
   a first magnet mounted on an outer side of the fixed portion to face one direction perpendicular to the optical axis;
   a first coil mounted on a guide member to face the first magnet;
   at least one second magnet mounted on the movable portion to face another direction perpendicular to the optical axis; and
   at least one second coil mounted on a housing to face the at least one second magnet,
   wherein the guiding portion has an alphabet 'C' shape, at least a side of which is open,
   wherein the first magnet and the first coil are configured to cause the fixed portion to move back and forth along the optical axis,
   wherein the at least one second magnet and the at least one second coil are configured to cause the movable portion to move in at least two directions including the other direction perpendicular to the optical axis, and
   wherein the one direction is a different direction than the other direction.

2. The camera module of claim 1, further comprising balls interposed between the fixed portion and the guiding portion, between the guiding portion and the movable portion, and between the fixed portion and the movable portion, respectively.

3. The camera module of claim 2, further comprising:
   at least one V groove extending in any direction on at least one surface of the guiding portion; and
   a ball pocket protruding from the at least one surface of the guiding portion to form a bearing groove on another surface,
   wherein the V groove and the bearing groove each receive one of the balls, respectively.

4. The camera module of claim 3, wherein a pair of the V grooves are formed having the ball pocket therebetween, and the V grooves and the ball pocket are arranged in a direction the V grooves extend.

5. The camera module of claim 3, wherein the V grooves are formed on opposite surfaces of the guiding portion, respectively, the V groove formed on one of the opposite surfaces extends in a first direction perpendicular to the optical axis, and the V groove formed on the other surface extends in a second direction perpendicular to the optical axis and the first direction.

6. The camera module of claim 3, wherein the ball received in the V groove and the ball received in the bearing groove overlap in at least parts thereof along the optical axis.

7. The camera module of claim 3, wherein at least a part of the ball received in the V groove protrudes from the at least one surface of the guiding portion and at least a part of the ball received in the bearing groove protrudes from the other surface of the guiding portion.

8. The camera module of claim 7, further comprising a second V groove formed in the fixed portion or the movable portion,
   wherein at least a part of the ball received in the V groove is received in the second V groove formed in the fixed portion or the movable portion.

9. The camera module of claim 2, further comprising:
   at least one yoke mounted on the fixed portion to correspond to the at least one second magnet,
   wherein the at least one second magnet and the at least one yoke generate magnetic forces for urging the movable portion to closely contact the fixed portion along the optical axis.

10. The camera module of claim 9, further comprising:
    at least one auxiliary magnet disposed symmetrically to the at least one second magnet with respect to the optical axis; and
    at least one auxiliary yoke disposed symmetrically to the at least one yoke with respect to the optical axis.

11. The camera module of claim 2, wherein at least one of the ball contacts the fixed portion and the movable portion at the same time.

12. The camera module of claim 1, wherein the guiding portion moves with respect to the fixed portion in a first direction on a plane perpendicular to the optical axis,
    and the movable portion moves with respect to the guiding portion in a second direction on a plane perpendicular to the optical axis while moving together with the guiding portion in the first direction, and
    the second direction is set perpendicular to the first direction.

13. The camera module of claim 12, wherein the housing receives the fixed portion, the movable portion, and the guiding portion and comprises at least one side parallel to the optical axis, and
    wherein the one side is disposed inclined with respect to the first direction and the second direction.

14. The camera module of claim 13,
    wherein the movable portion moves in the first direction or the second direction by an electromagnetic force generated by the at least one second magnet and the at least one second coil.

15. The camera module of claim 14, wherein a pair of the second magnets are mounted to face the first direction and the second direction, respectively.

16. The camera module of claim 12, further comprising a focusing driving unit provided on a side of the fixed portion to urge the fixed portion to move back and forth along the optical axis.

* * * * *